United States Patent [19]
Gray et al.

[11] Patent Number: 5,902,744
[45] Date of Patent: May 11, 1999

[54] COMPOST DECONTAMINATION OF SOIL CONTAMINATED WITH CHLORINATED TOXICANTS

[75] Inventors: Neil Cameron Croall Gray, Oakville; Guy Peter Moser; Lovi Eva Moser, both of Guelph, all of Canada

[73] Assignee: Stauffer Management Company, Wilmington, Del.

[21] Appl. No.: 08/742,508

[22] Filed: Nov. 1, 1996

[51] Int. Cl.$^6$ .............................. C12P 1/04; D06M 16/00; C12N 1/00
[52] U.S. Cl. ..................... 435/262.5; 435/170; 435/264; 435/267; 435/822; 71/15; 71/21; 71/25; 71/903; 588/207
[58] Field of Search .................................. 435/170, 262.5, 435/264, 267, 822; 71/15, 21, 25, 903; 588/207

[56] References Cited

U.S. PATENT DOCUMENTS

| | | | |
|---|---|---|---|
| 5,593,888 | 1/1997 | Glaze et al. | 435/262.5 |
| 5,660,612 | 8/1997 | Bernier et al. | 71/15 |
| 5,824,541 | 10/1998 | Horn et al. | 435/262.5 |

OTHER PUBLICATIONS

"Anaerobic DDT Biodegradation: Enhancement by Application of Surfactants and Low Oxidation Reduction Potential", Applied and Enviromental Microbiology, Dec. 19 You et al., pp. 1–35, 1994.

"Anaerobic DDT Degradation of Contaminated Soil by Mixed Consorting and Enhancement by Surfatant Addition in Slurry Reactors," You et al., Water Environment Federation, Oct. 1994, pp. 635–645.

"Principles of Composting", Golucke; The Biograde Guide to the Art of Science of Composting; Journal of Waste Recycling; The JG Press, Inc, 1991, pp. 14–27.

"Microbiological Degradation of Pesticides in Yard Waste Composting," Fogarty et al, Microbiology Reviews, Jun. 1991, pp. 225–233.

"Disposal of Organic Hazardous Wastes by Composting," Savage et al., Bio Cycle Jan./Feb. 1985 pp. 31–34.

*Primary Examiner*—David M. Naff
*Assistant Examiner*—Deborah K. Ware

[57] ABSTRACT

The present invention provides a process of decontaminating, by composting under specific conditions, soil and/or sediments containing certain toxic cyclical organic compound contaminants by converting these contaminants into harmless materials. The compounds include chlordane, dieldrin, toxaphene, aldrin, endrin, and heptachlorepoxide. The process includes the step of affecting a solid compost mixture during composting with a redox potential below negative 200 mV (millivolts). Further, the process includes several steps which are repeated until an amount of contaminant is degraded to less than 140 ppm (part per million) per ton of soil.

12 Claims, No Drawings

COMPOST DECONTAMINATION OF SOIL CONTAMINATED WITH CHLORINATED TOXICANTS

BACKGROUND OF THE INVENTION

This invention relates to a controlled composting process for decontaminating soil and/or sediments containing one or more of certain toxic cyclical organic compound contaminants, namely chlordane, dieldrin, toxaphene, aldrin, endrin, heptachlor, methoxychlor, heptachlorepoxide, and alpha, beta, gamma and delta benzene hexachlorides, hereinafter referred to collectively and singly as "chlorinated contaminants".

Numerous land sites exist that are contaminated with the chlorinated contaminants. Most of these contaminants are toxic pesticides and many are believed to be carcinogens. Various methods have been used to decrease the contamination of the soil including incineration, low temperature thermal desorption and chemical treatments. All of these methods are extremely expensive and may not be suitable for many contaminated sites.

SUMMARY OF THE INVENTION

The present invention provides a process of decontaminating soil and/or sediments containing one or more of the chlorinated contaminants by converting these contaminants into harmless materials, thereby decontaminating the soil to whatever extent desired, either partial decontamination or complete remediation.

The process comprises treating soil and/or sediment which contains populations of variable anaerobic and aerobic microbes capable of transforming the chlorinated contaminants into harmless materials and being viable under both anaerobic and aerobic conditions. The treatment comprises admixing the contaminated soil with amendment material to form a compost mixture containing organic nutrient materials; composting this mixture while maintaining its temperature in the range of about 20° C. to 65° C. and its water content in the range of about 40% to 100WHC; during this composting maintaining the redox potential of the compost mixture below about negative 200 mV until a significant amount of the chlorinated contaminant is degraded; and thereafter oxygenating the compost mixture to raise the redox potential level of the compost mixture to above about positive 100 mV, and maintaining the redox potential level above about positive 100 mV until a significant amount of the chlorinated contaminant is degraded.

The sequence of stages of negative/positive redox potential levels can be reversed and can be repeated as desired to yield soil containing little or no desirable chlorinated contaminants, these having been converted to harmless products.

DESCRIPTION OF THE INVENTION

The term "composting" as used herein in described the decontamination process of the present invention means transforming by degradation chlorinated contaminants in the soil and/or sediment to harmless materials utilizing biological activity, the process being carried out, preferably in the solid state, with the addition of organic nutrient material.

"Harmless materials" are materials that are unobjectionable in the concentrations present in soil or sediment for its intended use.

"Decontamination" means transforming chlorinated contaminants to harmless materials, including biodegrading said contaminants and binding said contaminants to soil or other material.

"Remediation" means decontamination to an unobjectionable level of chlorinated contaminants in the soil for the intended use of the soil.

"Soil" means earth, i.e. humus, sand and particulate rock, and includes sediment from beneath the surface of water.

In the process of the present invention, during composting the soil to be decontaminated must contain appropriate types of indigenous viable microbes capable of degrading chlorinated contaminants. These microbes must be viable under both the anaerobic and aerobic conditions to which they will be subjected during the present process. The microbes normally are bacteria, fungi, actinomycetes and to a lesser extent protozoa. The microbes preferably are indigenous to the contaminated soil, that is, they are present in the soil to be decontaminated; or they are recycled from, or along with, soil already subjected to the present process. In some cases it may be beneficial to add an inoculant containing such viable degrading microbes.

In the practice of the present invention a solid compost mixture is prepared by mixing appropriate soil amendment into the soil to be decontaminated, in an amount of at least about 10%, and up to 95% by weight of the mixture, and preferably from about 30% to 70% by weight amendment. The soil amendment material comprises a conventional source of organic nutrients for composting. The preferred amendment nutrient materials are agricultural waste and municipal waste sludge, preferably a manure such as horse, cow, sheep, turkey, chicken or fish manure, or activated sludge. Alfalfa, hay, sawdust, straw, peat, grass and other bulking materials preferably also are included in the amendment material, and may originate in manure or be specifically added. In some cases it may be desirable to add into the soil amendment a surfactant, preferably a formulated anionic and nonionic surfactant mixture, to render the contaminants more available to biological degradation. Suitable surfactants include polysorbates, octoxynols, anionic alkyl sulfates, anioic alkyl aryl sulfonates and ethoxylates. Examples of suitable surfactants include "Tween" nonionic surfactants which are commercially available from ICI Americas, Inc., "Triton" nonionic surfactants which are commercially available from Union Carbide and "DAWN" detergent nonionic surfactant mixture which is commercially available from Procter & Gamble. A suitable mixture of surfactants is "Triton" X-100 and "DAWN". The amendment material may also contain, or be supplemented with, liquid or solid organic or inorganic nutrients. Organic materials high in nitrates and phosphates are normally used.

The compost mixture is maintained moist, but preferably in a solid state. Throughout the process the moisture level is maintained at least than 100% of the mixture's water holding capacity (WHC), preferably in the range of about 40% to 100% WHC.

After mixing, biological degradation of organic matter in the mixture starts, raising the temperature and depleting the oxygen to an anaerobic condition. The temperature of the mixture is thereafter maintained within the range of about 20° C. to 65° C. This is easily done by controlled gas movement through the compost mixture (e.g. through pipes) and/or by the addition of nutrient material. Below about 20° C., the biodegradation proceeds uneconomically slowly; above about 65° C. excessive bacteria kill may take place. The preferred temperature range is within about 30° C. to 55° C. The aerobic microbes in the compost mixture remain viable for the subsequent aerobic degradation step and the anaerobic bacteria remain viable for any needed subsequent anaerobic degradation steps. Thus, it is essential that viable aerobic and anaerobic degradation microbes be maintained during the process of the present invention.

During the anaerobic step a low redox potential level is maintained in the compost mixture, below about negative 200 mV, and preferably within the range of about negative 300 mV to 500 mV. This level has been found to be optimum for the anaerobic degradation of chlorinated contaminants in the present composting process. The redox potential level can be maintained within this range by moist air movement through the compost and/or by the addition of conventional reducing agents such as sulphite and acetate compounds.

The first anaerobic step and any subsequent anaerobic steps are continued until a significant amount of chlorinated contaminant is degraded. This can be determined by analysis. Typically, in the first anaerobic step degradation of about 20% to 50% o the initial content of chlorinated contaminant is desirable.

After the chlorinated contaminant content of the soil/amendment mixture is decreased significantly in first anaerobic step, the mixture is oxygenated by any suitable means, preferably by air fed through and/or mixed with the mixture to achieve aerobic conditions. There must be sufficient oxygenation for the redox potential level during the aerobic step to be maintained above about positive 100 mV. The aerobic conditions bring about further degradation yielding harmless materials. The aerobic degradation step is continued until a significant amount of chlorinated contaminants is degraded.

In most cases, the desired degree of biodegradation of chlorinated contaminants for acceptable remediation will not be achieved in the first anaerobic/aerobic treatment sequence. In the highly preferred process, the sequence is therefore repeated one or more times as needed for acceptable soil remediation. Substantially complete decontamination from chlorinated contaminants is readily achievable by this multi-sequence preferred process.

Since test results have demonstrated excellent decontamination of soil containing the contaminants chlordane, dieldrin, and toxaphene, the preferred process of the present invention is the treatment of soil and/or sediment containing one or more of these contaminants, Not intending to be bound by the following theory, it is believed that during anaerobic degradation the anaerobic microbes remove at least one or two chlorines from the chlorinated contaminants. Further aerobic degradation reduces these to less toxic metobolites. Such significant quantities of the chlorinated contaminants and toxic metabolites may also be bound to soil and/or organic materials producing harmless materials, the term "degradation" as used herein includes not only biodegradation but also such binding of contaminants.

A desirable feature of this process is that the degrading microbes are maintained viable throughout the anaerobic/aerobic treatment cycles, so that it is not essential that microbes be supplemented before repeating the treatment cycle. However, it may be desirable to add more nutrient materials, manure, or other conventional fermentation ingredients, primarily to supplement the organic feed supply and to also introduce more bulking agent.

As aforementioned, maintaining the proper redox potential levels of the compost mixture in the anaerobic and aerobic steps is necessary for efficient practice of the present invention. The appropriate redox potential levels can be maintained by the addition of conventional nutrient materials and/or reducing agents such as sulphite and/or acetate compounds. Absolute anaerobic and aerobic conditions are needed (although short localized excursions can be expected). For the purpose of defining the present invention, a redox potential level of less than about negative 200 mV is considered anaerobic, and is required for the anaerobic steps; and a redox potential level greater than about positive 100 mV, is considered aerobic and is required for the aerobic steps. During the anaerobic steps, the preferred redox potential level is in the range of about negative 300 to 500 mV; and during the aerobic steps it is in the range of about positive 200 to 300 mV. The redox potential level from about negative 200 mV to about positive 100 mV is considered anoxic. In the present process, when going from anaerobic to aerobic conditions, and vice versa, anoxic conditions are present in the compost. During this period, degradation of some chlorinated contaminants appears to take place, but at low rates. Thus, speedy transition from one state to the other expedites overall degradation.

In the practice of the present invention, it may be desirable to have anaerobic conditions in some parts of the compost and at the same time aerobic conditions in other parts. This may be desirable because of different initial contaminant levels and/or degradation rates in different parts of the compost mixture. Thus, to approach uniform degradation, it may be desirable that some parts of the compost remain longer in an anaerobic or an aerobic state.

During composting high microbe counts are present, preferably up to $10^8$ aerobic culture forming units per gram, as measured by standard plate count techniques (cfu), and up to $10^6$ anaerobic cfu/g. These microbe counts of course include microbes other than those that degrade chlorinate contaminants.

In practice the present process is conducted in a compost pile, normally in a container cell or windrow. The soil to be treated can be analyzed and composted in the laboratory to determine optimum composting conditions, amendment composition, and anaerobic/aerobic treatment times and number of sequences. Typically for soil contaminated with up to 600 ppm of chlorinated contaminants, 3 sequences of 2 weeks anaerobic composting followed by 2 weeks of aerobic composting will decontaminate one ton batches of soil down to contaminants levels of less than 140 ppm chlorinated contaminants.

As above described, the present process involves an anaerobic composting stage followed by an aerobic stage. This sequence appears necessary to degrade toxic chlorinated contaminant metabolites. However, it may be desirable to initially treat the soil aerobically to lower the content of pre-existing toxic metabolites prior to the initial anaerobic stage.

The following Examples are illustrative of the practice of the present invention:

EXAMPLE 1

This example shows large scale composting of soil contaminated with chlordane and dieldrin. 8 tons of contaminated soil (21 ppm chlordane and 14.8 ppm dieldrin) mixed with cow manure (40% volume/volume), and straw (5% v/v) are placed in a composting box (8'×8'×8') with 2 sets of aeration piping, one at the base and one 3' above the base. After 2 days the temperature in the soil has increased to above 40° C. and remains at this temperature for at least 2 weeks, then drops to 30° C. in the 3rd and 4th weeks. For one month the system is maintained in an anaerobic state to enhance the initial dechlorination steps (the redox potential is less than minus 400 mV throughout the anaerobic cycle). This is followed by 1 weeks aerobic and one week anaerobic cycles during which the redox quickly changed from greater than positive 200 mV during the aerobic stages to less than minus 400 mV during the anaerobic stages. During the treatment the soil water content fluctuates between 40% and 100% WHC.

After a total of 24 weeks the chlorinated contaminants levels has dropped to 6.2 ppm of chlordance and 2.6 ppm of dieldrin, 71% and 82% reductions, respectively.

EXAMPLE 2

Wet soil contaminated with 955 mg./Kg of toxaphene is mixed with 60% cow manure volume/volume (v/v) and 5% straw v/v. Six 950 gram samples (Samples Nos. 1–6) of this mixture, containing water at about 60–70% WHC, are flushed thoroughly with an anaerobic mixture of 5% hydrogen, 5% carbon dioxide and 90% nitrogen and then put into an air tight anaerobic chamber, capped tightly and incubated at 35–40 degrees C for two weeks. The soils are mixed weekly. During this anaerobic treatment the redox potential decreases rapidly and remains below negative 200 mV throughout the anaerobic treatment.

The samples are then uncapped and thoroughly mixed weekly to aerate with atmospheric air at 80% relative humidity at 35–40 degrees C for three weeks. The moisture level is maintained at 60–70% WHC by twice weekly manual addition of water and mixing. During this aerobic treatment the redox potential rapidly rises quickly and remains above positive 100 mV throughout the aerobic treatment.

During this treatment average sample contamination levels of toxaphene are found to be as follows: 955 mg/Kg.; after 2 weeks, 450 mg/Kg. (53% reduction); after 5 weeks, 270 mg/Kg. (72% reduction). Repeated sequences of such anaerobic/aerobic treatment will give further toxaphene reduction.

EXAMPLE 3

In this study, nine 150 g. samples of soils contaminated with 50–100 ppm of the listed contaminants (Test Nos. 7–15) are mixed with 40% v/v horse manure and 5% v/v straw, the mixtures containing water at about 80% WHC.

Contaminants 7. aldrin
8. dieldrin
9. endrin
10. benzene hexachloride (BHC)—mixture of alpha, beta, gamma and delta
11. chlordane
12. heptachlor
13. heptachlor epoxide
14. methoxychlor
15. toxaphene These samples are then treated following the procedure of Example 2 except that the temperature is maintained at 36 degrees C, the anaerobic treatment period is 4 weeks and the aerobic treatment period is 2 weeks. Significant reductions in contaminant level occur during both the anaerobic and aerobic periods of tests 7–15.

EXAMPLE 4

This example illustrates the use of several amendment blends of sphagnum peat moss, cattle manure and straw to promote chlorinated contaminant degradation in soil during composting.

In this study soils contaminated with 100 ppm of various chlorinated contaminants are mixed with the various amendment blends, as shown in the following Table, and the mixtures but into laboratory scale composters, approximately 65 g of compost mixture (about 75% WHC) in each test composter.

During the study the test composters are alternatively oxygenated for 5 days with air and then 2 days with nitrogen (0.5 liters per minute, LPM) from below the soil mixture alternatively giving highly aerobic and anaerobic conditions. While under aerobic conditions the redox potential remains below negative 200 mV; while under aerobic conditions the redox potential remains over positive 100 mV. Because the volume of the soil samples is too low for metabolic processes to cause sufficient heating, the experiments are contained in an incubator with the temperature gradually increasing from 25° C. to 55° C. The moisture content is maintained at 60% to 80% WHC by twice weekly manual addition of water and mixing. After 54 days the study is discontinued.

TABLE

| Test # | Contaminant wgt. ratio | % Composition of Compost Mixture | | | |
|---|---|---|---|---|---|
| | | SOIL | PEAT | MANURE | STRAW |
| 16. | aldrin/dieldrin, 50:50 | 25 | 0 | 40 | 25 |
| 17. | heptachlor/endrin 25/75 | 24 | 1 | 35 | 30 |
| 18. | chlordane/methoxychlor 25/75 | 30 | 2 | 40 | 28 |
| 19. | toxaphene/heptachlor 80/20 | 28 | 3 | 34 | 34 |
| 20. | aldrin/heptachlorepoxide 5/95 | 35 | 5 | 45 | 25 |

During each of tests Nos. 16–20, significant reduction of chlorinated contaminant occurs.

EXAMPLE 5

The procedure of Example 3 is followed, except using the bulking and nutrient materials listed in the following Table for soil amendments in place of the straw and cattle manure in Example 3. As in Example 3, 55/5/40 soil/bulking material/nutrient material by weight compost mixture are used.

TABLE

| Composition of Amendments (55/5/40 weight proportions) | |
|---|---|
| 21. | soil/alfafa/sheep manure |
| 22. | soil/hay/turkey manure |
| 23. | soil/sawdust/chicken manure |
| 24. | soil/grass/activated sludge |

During the composting, significant decrease in chlorinated contaminant content of the soil occurs in each test.

What is claimed:

1. A process of decontamination of soil containing a chlorinated cyclical organic compound contaminant selected from the group consisting of chlordane, dieldrin, toxaphene, aldrin, endrin, heptachlor, heptachlorepoxide, and alpha, beta, gamma and delta benzene hexachlorides, said soil containing populations of variable anaerobic and aerobic microbes capable of transforming said contaminant into harmless materials and said process comprising:

(a) admixing soil amendment into said soil, in an amount of at least about 10% and up to 95% by weight of the resultant mixture of said soil and said soil amendment, to form a solid compost mixture comprising organic nutrient for composting;

(b) composting said soil while maintaining the temperature of the compost mixture in the range of about 20° C. to 65° C. and the water content of the compost mixture in the range of about 40% to 100% water holding capacity (c) during said composting maintaining a redox potential level of the compost mixture below about negative 200 mV;

(d) thereafter oxygenating the compost mixture to raise the redox potential level of the compost mixture to above about positive 100 mV, and maintaining the redox potential level to above about positive 100 mV until said contaminant is further degraded; and (e) wherein the sequence of steps (a) to (d) are repeated until an amount of said contaminant is degraded to less than 140 ppm per ton of the soil.

2. A process of claim 1 wherein the sequence of steps (b) through (d) are repeated.

3. A process of claim 1 wherein the compost mixture comprises a bulking material.

4. A process of claim wherein said organic nutrient is selected from the group consisting of horse, cow, sheep, fish, turkey, chicken manures and activated sludge.

5. A process of claim 1 wherein the compost mixture comprises a bulking material selected from the group consisting of straw, peat, alfalfa, hay, sawdust and grass.

6. A process of claim 1 wherein a surfactant is added to the compost mixture.

7. A process of claim 6 wherein the surfactant is selected from the group consisting of non-ionic surfactants and anionc surfactants.

8. A process of claim 1 wherein said temperature is in the range of about 30° C. to 55° C.

9. A process of claim 1 wherein when said redox potential level is below negative 200 mV and is maintained in the range of about negative 300 mV to 500 mV, and further when said redox potential level is above about positive 100 mV it is maintained in the range of about positive 200 to 300 mV.

10. A process of claim 1 wherein said contaminant is selected from the group consisting of chlordane, dieldrin, and toxaphene.

11. A process of claim 1 wherein said solid compost mixture initially comprises 30% to 70% by weight of said soil amendment in the resultant mixture.

12. A process of claim 1 wherein said compost mixture comprises a material selected from the group consisting of agricultural waste, municipal sludge and bulking material.

* * * * *